US008236262B2

(12) United States Patent
Potter et al.

(10) Patent No.: US 8,236,262 B2
(45) Date of Patent: Aug. 7, 2012

(54) DESULFURIZATION MATERIALS

(75) Inventors: Gavin Potter, Heysham (GB); Gordon Edward Wilson, Stockton on Tees (GB); Norman Macleod, Hartlepool (GB); Antonio Chica Lara, Valencia (ES); Avelino Corma Canos, Valencia (ES); Yonhy Saavedra Lopez, Vallada (ES)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 12/921,936

(22) PCT Filed: Feb. 25, 2009

(86) PCT No.: PCT/GB2009/050190
§ 371 (c)(1),
(2), (4) Date: Sep. 10, 2010

(87) PCT Pub. No.: WO2009/112855
PCT Pub. Date: Sep. 17, 2009

(65) Prior Publication Data
US 2011/0014105 A1    Jan. 20, 2011

(30) Foreign Application Priority Data

Mar. 12, 2008   (GB) .................... 0804570.0

(51) Int. Cl.
| | |
|---|---|
| B01D 53/00 | (2006.01) |
| B01J 8/00 | (2006.01) |
| B01J 23/00 | (2006.01) |
| B01J 21/00 | (2006.01) |
| B01J 20/00 | (2006.01) |
| B01J 29/00 | (2006.01) |
| B01J 37/00 | (2006.01) |
| C01B 7/00 | (2006.01) |
| C01G 45/00 | (2006.01) |
| C01G 25/00 | (2006.01) |

(52) U.S. Cl. ......... 423/244.02; 423/244.06; 423/244.07; 423/244.08; 423/244.09; 423/244.1; 502/161; 502/176; 502/245; 502/253; 502/259; 502/326; 502/327; 502/328; 502/329; 502/330; 502/331; 502/332; 502/335; 502/337; 502/340; 502/341; 502/342; 502/343; 502/344; 502/345; 502/346; 502/355; 502/415; 502/439; 208/208 R; 208/209; 208/213; 208/214; 208/217

(58) Field of Classification Search .................. 502/161, 502/176, 245, 253, 259, 326–332, 335, 337, 502/340–346, 355, 415, 439; 423/244.02, 423/244.06, 244.07, 244.08, 244.09, 244.1; 208/208 R, 209, 213, 214, 217
See application file for complete search history.

(56) References Cited

U.S. PATENT DOCUMENTS

| | | | |
|---|---|---|---|
| 4,233,276 A | | 11/1980 | D'Souza et al. |
| 4,690,806 A | * | 9/1987 | Schorfheide .................. 423/230 |
| 4,762,817 A | | 8/1988 | Logsdon |
| 4,876,402 A | | 10/1989 | Logsdon |
| 5,116,587 A | | 5/1992 | Pinnavaia et al. |
| 5,266,188 A | | 11/1993 | Kukes et al. |
| 5,776,331 A | * | 7/1998 | Khare et al. .................. 208/247 |
| 5,785,938 A | | 7/1998 | Pinnavaia et al. |
| 5,972,835 A | * | 10/1999 | Gupta .......................... 502/439 |
| 6,042,798 A | * | 3/2000 | Masuda et al. ........... 423/244.01 |
| 6,071,433 A | | 6/2000 | Bhattacharyya |
| 6,274,533 B1 | | 8/2001 | Khare |
| 6,350,422 B1 | * | 2/2002 | Khare et al. .................. 423/230 |
| 6,428,761 B1 | * | 8/2002 | Shore et al. .............. 423/244.01 |
| 6,429,170 B1 | * | 8/2002 | Dodwell ....................... 502/400 |
| 6,656,877 B2 | * | 12/2003 | Sughrue et al. ............... 502/414 |
| 6,864,215 B2 | * | 3/2005 | Dodwell et al. .............. 502/414 |
| 6,887,445 B2 | * | 5/2005 | Braga et al. .............. 423/244.06 |
| 6,930,074 B2 | * | 8/2005 | Khare et al. .................. 502/342 |
| 6,951,635 B2 | * | 10/2005 | Gangwal et al. .......... 423/244.06 |
| 7,033,972 B2 | * | 4/2006 | Shikada et al. ............... 502/307 |
| 7,268,097 B2 | * | 9/2007 | Katsuno et al. .............. 502/259 |
| 7,578,986 B2 | * | 8/2009 | Hampden-Smith et al. .. 423/220 |
| 7,749,376 B2 | * | 7/2010 | Turbevillle et al. ........... 208/246 |
| 7,837,964 B2 | * | 11/2010 | Wessel et al. ................. 423/220 |
| 7,842,645 B2 | * | 11/2010 | Kim et al. ..................... 502/411 |
| 7,897,538 B2 | * | 3/2011 | Landau et al. ................ 502/407 |
| 2002/0043484 A1 | * | 4/2002 | Khare .......................... 208/244 |

(Continued)

FOREIGN PATENT DOCUMENTS

EP         0317975         5/1989

(Continued)

OTHER PUBLICATIONS

Cavani et al., "Hydrotalcite-type Anionic Clays: Preparation, Properties and Applications," *Catalysis Today*, 1991, vol. 11, pp. 173-301.

*Primary Examiner* — Cam N. Nguyen
(74) *Attorney, Agent, or Firm* — RatnerPrestia

(57) ABSTRACT

A particulate desulfurization material includes one or more nickel compounds, a zinc oxide support material, and one or more alkali metal compounds wherein the nickel content of the material is in the range 0.3 to 10% by weight and the alkali metal content of the material is in the range 0.2 to 10% by weight. A method of making the desulfurization material includes the steps:

(i) contacting a nickel compound with a particulate zinc support material and an alkali metal compound to form an alkali-doped composition, (ii) shaping the alkali-doped composition, and (iii) drying, calcining, and optionally reducing the resulting material.

The desulfurization material may be used to desulfurize hydrocarbon gas streams with reduced levels of hydrocarbon hydrogenolysis.

12 Claims, No Drawings

U.S. PATENT DOCUMENTS

| | | | |
|---|---|---|---|
| 2002/0147103 A1* | 10/2002 | Ruettinger et al. | 502/66 |
| 2003/0032555 A1* | 2/2003 | Dodwell | 502/400 |
| 2003/0114299 A1* | 6/2003 | Khare | 502/411 |
| 2003/0166465 A1 | 9/2003 | Khare | |
| 2004/0048743 A1* | 3/2004 | Malandra et al. | 502/406 |
| 2004/0121906 A1 | 6/2004 | Gislason et al. | |
| 2004/0151646 A1* | 8/2004 | Scranton, Jr. | 423/244.1 |
| 2006/0081499 A1* | 4/2006 | Khare | 208/15 |

FOREIGN PATENT DOCUMENTS

| | | |
|---|---|---|
| EP | 1 192 981 A1 | 4/2002 |
| EP | 1 224 970 A1 | 7/2002 |
| EP | 1 270 069 A1 | 1/2003 |
| JP | 2006-225615 A | 8/2006 |
| SU | 959821 | 9/1982 |

* cited by examiner

DESULFURIZATION MATERIALS

CROSS-REFERENCE TO RELATED APPLICATIONS

This application is the U.S. National Phase application of PCT International Application No. PCT/GB2009/050190, filed Feb. 25, 2009, and claims priority of British Patent Application No. 0804570.0, filed Mar. 12, 2008, the disclosures of both of which are incorporated herein by reference in their entirety for all purposes.

FIELD OF THE INVENTION

This invention relates to desulphurisation materials and in particular desulphurisation materials comprising nickel.

BACKGROUND OF THE INVENTION

Hydrocarbon feedstocks intended for use in synthesis gas generation must first be desulphurised in order to protect sensitive downstream catalysts from deactivation. Sulphur removal is conventionally carried out using a combination of hydrodesulphurisation (HDS) catalysis (based typically on CoMo or NiMo catalysts) and zinc oxide based absorbents. In this process, the HDS catalyst converts any organosulphur species in the feed to hydrogen sulphide, which may be subsequently removed by reaction with ZnO. In order for the hydrodesulphurisation reaction to occur, it is necessary to have hydrogen present in the feed. As an alternative to the two-stage process discussed above, a single material that combines both hydrodesulphurisation activity and ability to absorb hydrogen sulphide can also be employed.

Nickel containing desulphurisation materials have been proposed previously for a variety of desulphurisation applications.

SU959821 discloses a catalyst for the desulphurisation of gases, comprising 0.6-5.0% wt nickel oxide, 5.4-10.0% wt copper oxide, 5-16% wt aluminium oxide and the remainder zinc oxide. The gases that may be desulphurised using this material were stated to be natural gases, gases produced during the refining and cracking of crude oil, and also process gases containing $H_2$, CO and $CO_2$. The catalysts were prepared by combining zinc oxide, copper oxide, basic nickel carbonate and aluminium oxide in an ammonium carbonate solution, and ageing the resultant mixture at temperatures in the range 45-85° C. The resultant mass was dried at 100-110° C. and calcined at 350-400° C.

EP1224970 discloses a catalyst for deep desulphurisation of a mineral oil corresponding to kerosene, comprising 5 to 25% by weight nickel oxide, 30 to 70% by weight zinc oxide, and aluminium oxide. The process for producing the deep desulphurisation catalyst comprised mixing a basic substance with each of an aqueous solution of a nickel salt and an aqueous solution of a zinc salt or with a mixed aqueous solution thereof to form precipitates separately or simultaneously, and mixing the precipitates with aluminium oxide or an aluminium oxide precursor, followed by shaping and calcining.

U.S. Pat. No. 6,274,533 discloses sorbent systems for the desulphurisation of cracked-gasoline or diesel fuels comprising a reduced bimetallic promoter formed of at least two metals selected from the group consisting of nickel, cobalt, iron, manganese, copper, zinc, molybdenum, tungsten, silver, tin, antimony and vanadium on a particulate support comprising zinc oxide. The preferred bimetallic promoter was a mixture of nickel and cobalt on a particulate support comprised of zinc oxide, silica and alumina. The methods disclosed for the preparation of these materials included addition of bimetallic promoter compounds to the support components prior to drying and calcining, or impregnation of dried and calcined support particulates with a solution that contains the elemental metals, metal oxides or metal-containing compounds of the selected promoter system. The preferred preparative route comprised the steps of: (a) admixing zinc oxide, silica and alumina so as to form a mixture in the form of a wet mix, dough, paste or slurry; (b) particulating the resulting mix to form granules, extrudates, tablets, pellets, spheres or microspheres; (c) drying the resulting particulate; (d) calcining the dried particulate; (e) impregnating the resulting calcined particulate with bimetallic promoter; (f) drying the impregnated particulate; (g) calcining the resulting dried particulate; and (h) reducing the calcined particulate product of (g) with a suitable reducing agent so as to produce a particulate composition having a substantially reduced bimetallic promoter content therein.

SUMMARY OF THE INVENTION

It is believed that the Ni component catalyses hydrodesulphurisation of any organo-sulphur species in the feed, whilst the ZnO absorbs the hydrogen sulphide produced (by reaction to form ZnS). Whereas the nickel is active in reduced form, and it is possible to supply a pre-reduced and passivated material to the user, it is common practice to provide an oxidic material to the user, who performs a reduction step in-situ.

Although these nickel-based materials have been shown to be effective in the removal of sulphur species from hydrocarbon feedstocks, their applicability is restricted by the fact that they can also catalyse hydrocarbon hydrogenolysis, a highly undesirable side reaction. The main concern with this reaction is its exothermic nature, which can result in significant over-temperatures being developed in the catalyst bed. In addition, the reaction also consumes valuable hydrogen.

It has been found that alkali metal compounds are able to suppress the hydrogenolysis reaction without significantly reducing the hydrogenation and sulphur absorption capacity of Ni-zinc oxide desulphurisation materials.

Accordingly, the invention provides a particulate desulphurisation material comprising one or more nickel compounds, a zinc oxide support material, and one or more alkali metal compounds wherein the nickel content of the material is in the range 0.3 to 10% by weight and the alkali metal content of the material is in the range 0.2 to 10% by weight.

The invention further provides a method of making a desulphurisation material comprising the steps:
(i) mixing a nickel compound with a particulate zinc material and an alkali metal compound to form an alkali-doped composition,
(ii) shaping the alkali-doped composition, and
(iii) drying and calcining, and optionally reducing the resulting material.

The invention further provides a process for the desulphurisation of a process fluid stream comprising contacting the stream in the presence of hydrogen with the desulphurisation material.

DETAILED DESCRIPTION OF THE INVENTION

The nickel compound may be selected from the group consisting of nickel metal, nickel oxide, nickel hydroxide, nickel nitrate, nickel acetate and nickel hydroxycarbonate. The nickel compound used in the preparation of the material may be the same or different to that in the final material. In one embodiment a nickel hydroxycarbonate is combined with the other components and the resulting mixture calcined to provide the material with the nickel in the form of nickel oxide. Whether the nickel is in the form of nickel oxide or another nickel compound, in use, the material will be usually exposed to a reducing gas stream such that the nickel compound will be reduced to nickel metal. The amount of nickel compound present in the material in a reduced or unreduced state is such that the nickel content is in the range 0.3 to 10% by weight, preferably 0.7-5% by weight.

The particulate zinc material may be selected from zinc oxide, a zinc oxide/alumina mixture or a zinc-alumina hydrotalcite material. The particulate zinc material may also comprise one or more precursors that form zinc oxide upon calcination. The Zn content after calcination (as ZnO) is preferably >55% wt, more preferably >75% wt, especially >80% wt in the desulphurisation material.

The desulphurisation material may further comprise a copper compound selected from copper metal, copper oxide, copper hydroxide, copper nitrate, copper acetate and copper hydroxycarbonate. The copper compound used in the preparation of the material may be the same or different to that in the final material. In one embodiment a copper hydroxycarbonate is combined with the other components and the resulting mixture calcined to provide the material with the copper in the form of copper oxide. Whether the copper is in the form of copper oxide or another copper compound, in use, the material will be usually exposed to a reducing gas stream such that the copper compound will be reduced to copper metal. The amount of copper compound present is preferably such that the copper content of the material in a reduced or unreduced state is in the range 0.3 to 10% by weight, more preferably 0.7 to 5% by weight. In a particularly preferred embodiment the molar ratio of Ni:Cu in the desulphurisation material is in the range 0.8:1 to 1.2:1.

The alkali metal compound may be a sodium, potassium, lithium or caesium compound. Preferably, the alkali metal compound is an oxide, carbonate or hydrogen carbonate. More preferably the alkaline compound is sodium oxide or sodium carbonate. The amount of alkali metal compound present in the material is such that the alkali metal content of the material is in the range 0.2 to 10% by weight, preferably 0.2 to 5% by weight.

The desulphurisation material may be prepared using known methods, such as impregnation of the particulate support material with nickel and alkali metal compounds followed by drying, or extrusion of pastes comprising support material, nickel compound and alkali metal compound followed by drying; or granulation of powdered nickel compound, zinc support material and alkali metal compound, usually in the presence of a binder, followed by drying. Suitable binders include calcium aluminate cements and clay binders such as attapulgite or sepiolite clays. Preferably the desulphurisation material is prepared by granulation. In this technique, powdered nickel compound, zinc support material, alkali metal compound and a binder are mixed in the presence of a small amount of water in order to form roughly spherical agglomerates with diameters in the range 1-10 mm. The granulated materials are dried and calcined to form the desulphurisation material in oxidic form.

Hence the method of making a desulphurisation material according to the present invention may comprise the steps of:
(i) mixing a powdered nickel compound with a particulate zinc material, and a powdered alkali metal compound, in the presence of water to form an alkali-doped composition,
(ii) shaping the alkali-doped composition, and
(iii) drying and calcining the shaped alkali-doped composition.

The shaping may be the act of granulation itself, or may be the separate pelleting or extrusion of the material through shaped dies according to methods known to those skilled in the art. Hence the desulphurisation material may be in the form of shaped units such as spheres, pellets, cylinders, rings, or multi-holed pellets, which may be multi-lobed or fluted, e.g. of cloverleaf cross-section.

Drying and calcining may be performed in one or two stages. Drying is typically performed at 40 to 120° C. Calcination may be performed at 250° C. to 750° C. for up to 24 hours, but is preferably performed at 250 to 550° C. over 1-10 hours.

To render the desulphurisation material active, the Ni component should be reduced in a reducing gas stream in order to convert the Ni to elemental form. If a copper compound is present it may also be reduced. Reduction may be performed on the dried shaped mixture of alkali-doped nickel compound and support material, or the calcined shaped mixture of alkali-doped nickel compound and support material. Reduction on the calcined material is preferred. Reduction may be performed ex-situ or in-situ, i.e. in the vessel in which it is to be used for desulphurisation. Known methods for causing reduction of the Ni component may be used. The reducing gas stream may be the process fluid to be desulphurised, where it contains hydrogen and/or carbon monoxide. Preferably, the desulphurisation material is activated in-situ using a hydrogen-containing gas stream. The activation is normally performed at elevated temperature, for example in the range 250 to 500° C. and pressure in the range 1 to 100 bar abs.

In a preferred embodiment, the desulphurisation material comprises 0.3-10% by weight nickel, 0-10% by weight copper, 1-15% by weight $Al_2O_3$, 0.2 to 10% by weight sodium, 0-10% by weight binder and the balance ZnO.

The desulphurisation materials obtained by the process of the present invention may be applied to the desulphurisation of a wide range of sulphur containing liquids and gases including hydrocarbons such as natural gas, liquid natural gas, natural gas liquids, kerosene, cracked naphtha, diesel fuels; carbon dioxide, carbon monoxide, hydrogen and mixtures of these, including synthesis gas mixtures with a wide range of compositions. In particular, the desulphurisation materials may be applied to gaseous streams such as gaseous hydrocarbons or synthesis gas mixtures. Preferably the desulphurisation materials of the present invention are applied to gaseous hydrocarbon streams, particularly natural gas streams.

In use, the process for the desulphurisation of a process fluid will comprise contacting the liquid or gaseous process fluid, in the presence of hydrogen, with a desulphurisation material, for example a fixed bed of a particulate desulphurisation material at temperatures in the range 10 to 450° C. and at pressures in the range 1 to 100 bar abs. Hydrogen is required in use, and may typically be provided in the streams at a minimum level in the range 0.1 to 25% volume.

It may be desirable, in order to deep desulphurise the process fluid, to introduce a bed of particulate zinc oxide hydrogen sulphide absorbent downstream of the desulphurisation material prepared according to the present invention, in order to capture any slipped hydrogen sulphide.

The desulphurisation materials obtained according to the process of the present invention are able to remove a wide range of sulphur compounds including hydrogen sulphide, carbonyl sulphide, carbon disulphide, mercaptans such as t-butyl mercaptan, dialkyl sulphides such as dimethyl sulphide, cyclic sulphides such as tetrahydrothiophene, dialkyl disulphides such as diethyl disulphide and thiophenic species.

EXAMPLES

The invention will now be further described by reference to the following examples.

Example 1 (Comparative)

At full production scale, to 100 parts by weight of a particulate zinc support material were added 7 parts of a calcium aluminate binder, 2.2 parts copper hydroxycarbonate and 2.7 parts nickel hydroxycarbonate. The resulting powder was thoroughly mixed and then granulated using an orbital planetary mixer. The produced granules were then sieved and the on-size fraction (2.8-4.75 mm) calcined at 300° C. to form the mixed oxide. The NiO and CuO loadings in the finished product were both 1.5 wt %.

Example 2 (Comparative)

At lab scale, to a particulate zinc support precursor (6.00 Kg) were added calcium aluminate binder (0.42 Kg), copper hydroxycarbonate (0.13 Kg) and nickel hydroxycarbonate (0.16 Kg). The resulting powder was thoroughly mixed and then granulated using a lab-scale orbital planetary mixer. The produced granules were then sieved and the on-size fraction (2.8-4.75 mm) calcined at 300° C. to form the mixed oxide. The NiO and CuO loadings in the finished product were both 1.5 wt %.

Example 3

The method of Example 2 was repeated with the exception that 0.034 Kg of sodium carbonate was also added to the powder mix. This provided a $Na_2O$ loading of 0.5 wt % in the calcined product.

Example 4

The method of Example 2 was repeated with the exception that 0.34 Kg of sodium carbonate was also added to the powder mix. This provided a $Na_2O$ loading of 5.0 wt % in the calcined product.

Example 5

The method of Example 1 was repeated with the exception that 0.8 parts by weight of sodium carbonate was also added to the powder mix. This provided a $Na_2O$ loading of 0.65 wt % in the calcined product.

Example 6

Activity Testing (a) Hydrocarbon Hydrogenolysis

A feed gas consisting of 20% vol hydrogen in natural gas was passed at a pressure of 40 barg and a GHSV of 1800 $hr^{-1}$ through a bed of the granulated particulate desulphurisation materials obtained in the Comparative Example 1 and 2 and in Examples 3 and 4. The bed temperatures were heated from ambient to 370° C. at a heating rate of 1° C./min, and then held at 370° C. for approximately 20 hours.

The natural gas employed in these tests contained approximately 88% vol methane, with the balance made up of $CO_2$, $N_2$, ethane and various heavier hydrocarbons.

All the heavier hydrocarbons analysed (C2-C7) showed similar trends in terms of hydrogenolysis. n-Butane and n-Pentane conversion are used here as representative examples. The inlet feed contained 0.330 vol % n-butane and 0.025 vol % n-pentane. Under the conditions specified, the maximum conversions of n-butane and n-pentane to methane observed over the various samples were, as shown by gas chromatographic analysis, as follows;

| Catalyst | % n-Butane conversion | % n-Pentane conversion |
| --- | --- | --- |
| Comparative Example 1 | 57.0 | 61.2 |
| Comparative Example 2 | 98.9 | 99.8 |
| Example 3 | 2.8 | 14.6 |
| Example 4 | 0.1 | 6.8 |
| Example 5 | 7.9 | 26.3 |

Both comparative examples show considerably higher n-butane and n-pentane conversion. The lab-scale material shows higher conversion, possibly due to better homogeneity. The calcium aluminate binder has no effect on the hydrogenolysis.

(b) Hydrodesulphurisation

In a first test, a feed gas consisting of 2% hydrogen in natural gas+2 ppm organosulphur compounds, was passed at 343° C., 35 barg and at a GHSV of 4,000 $hr^{-1}$ through a bed of particulate desulphurisation materials prepared according to Comparative Example 1 and Example 3. In this test, the organosulphur compounds consisted of equal parts of COS (carbonyl sulphide), DMS (dimethyl sulphide) and thiophene. After 10 days on line under these conditions, full conversion of COS and DMS was observed over both samples. The conversion of thiophene was as follows:

| Catalyst | % Thiophene conversion |
| --- | --- |
| Comparative Example 1 | 99.3 |
| Example 3 | 89.6 |

In a second test, a feed gas consisting of 2% hydrogen in natural gas+2 ppm organo-sulphur compounds, was passed at 343° C., 35 barg and at a GHSV of 20,000 $hr^{-1}$ through a bed of particulate desulphurisation materials prepared according to Comparative Example 1 or according to Example 3. In this test, the organosulphur compounds consisted of equal parts of COS (carbonyl sulphide), DMS (dimethyl sulphide) and thiophene. After 5 days on line, full conversion of COS was again observed over Comparative Example 1 and Example 3 under these conditions. Corresponding conversions of DMS and thiophene were as follows

| Catalyst | % Thiophene conversion | % DMS conversion |
| --- | --- | --- |
| Comparative Example 1 | 61.2 | 91.4 |
| Example 3 | 49.6 | 89.4 |

In a third test, a feed gas consisting of 2% hydrogen in natural gas+2 ppm organosulphur compounds, was passed at 343° C., 35 barg and at a GHSV of 8,000 $hr^{-1}$ through a bed of particulate desulphurisation materials prepared according to Example 5. In this test, the organosulphur compounds consisted of equal parts of carbonyl sulphide, dimethyl sulphide, t-butyl mercaptan and tetrahydrothiophene. After 15 days on line, full conversion of all four organosulphur species was observed under these conditions.

From the above data it is clear that appropriate sodium addition to these materials significantly reduces their hydrogenolysis activity whilst allowing highly effective hydrodesulphurisation activity to be retained. In effect, the sodium component acts as a selective poison towards the undesirable hydrocarbon hydrogenolysis reaction.

Accordingly the invention provides a suitably active desulphurisation product in which the hydrocarbon hydrogenolysis activity has been effectively reduced to provide an advantageous balance of activity and selectivity. The low alkali metal modifier loadings required also minimise dilution of the ZnO component, therefore allowing sulphur absorption capacity to be maintained as high as possible.

The invention claimed is:

1. A particulate desulfurization material comprising one or more nickel compounds, one or more copper compounds, a zinc oxide support material, and one or more alkali metal compounds selected from the group consisting of an oxide, carbonate and hydrogen carbonate of sodium, lithium, potassium and cesium, wherein the nickel content of the material is in the range 0.3 to 10% by weight, the copper content of the material is in the range 0.3 to 10% by weight, and the alkali metal content of the material is in the range 0.2 to 10% by weight.

2. A desulfurization material according to claim 1 wherein the nickel compound is selected from the group consisting of nickel metal, nickel oxide, nickel hydroxide, nickel nitrate, nickel acetate and nickel hydroxycarbonate.

3. A desulfurization material according to claim 1 wherein the zinc oxide support material is selected from the group consisting of zinc oxide, a zinc oxide/alumina mixture, and a zinc-alumina hydrotalcite.

4. A desulfurization material according to claim 1 wherein the one or more copper compounds is selected from the group consisting of copper metal, copper oxide, copper hydroxide and copper hydroxycarbonate.

5. A desulfurization material according to claim 1 comprising 0.3-10% by weight nickel, 0.3-10% by weight copper, 1-15% by weight $Al_2O_3$, 0.2 to 10% by weight sodium, 0-10% by weight binder and the balance ZnO.

6. A method of making a desulfurization material according to claim 1 comprising the steps:
   (i) mixing the nickel compound and the copper compound with a particulate zinc support material and an alkali metal compound selected from the group consisting of an oxide, carbonate and hydrogen carbonate of sodium, lithium, potassium and cesium to form an alkali-doped composition,
   (ii) shaping the alkali-doped composition, and
   (iii) drying and calcining, and optionally reducing the resulting material.

7. A method according to claim 6 wherein the nickel compound is selected from the group consisting of nickel oxide, nickel hydroxide, nickel nitrate, nickel acetate and nickel hydroxycarbonate.

8. A method according to claim 6 wherein the zinc support material is selected from the group consisting of zinc oxide, a zinc oxide/alumina mixture, and a zinc-alumina hydrotalcite.

9. A method according to claim 6 wherein the copper compound is selected from the group consisting of copper oxide, copper hydroxide, copper nitrate, copper acetate and copper hydroxycarbonate.

10. A method according to claim 6 wherein the calcined desulfurization material is reduced.

11. A method according to claim 6 wherein the zinc support material comprises one or more precursors that form zinc and/or aluminum oxide upon calcination.

12. A process for the desulfurization of a process fluid stream comprising contacting the stream, in the presence of hydrogen, with a desulfurization material according to claim 1 or as prepared according to claim 6.

* * * * *